United States Patent
Yanagisawa et al.

(10) Patent No.: US 11,209,835 B2
(45) Date of Patent: Dec. 28, 2021

(54) DRONE MANEUVERING SYSTEM, MANEUVERING SIGNAL TRANSMITTER SET, AND DRONE MANEUVERING METHOD

(71) Applicant: NEC Solution Innovators, Ltd., Tokyo (JP)

(72) Inventors: Hiroaki Yanagisawa, Tokyo (JP); Koji Morishita, Tokyo (JP); Hisashi Noda, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 272 days.

(21) Appl. No.: 16/470,622

(22) PCT Filed: Dec. 20, 2017

(86) PCT No.: PCT/JP2017/045629
§ 371 (c)(1),
(2) Date: Jun. 18, 2019

(87) PCT Pub. No.: WO2018/123747
PCT Pub. Date: Jul. 5, 2018

(65) Prior Publication Data
US 2019/0317528 A1    Oct. 17, 2019

(30) Foreign Application Priority Data
Dec. 28, 2016   (JP) .............................. JP2016-256922

(51) Int. Cl.
*G05D 1/08* (2006.01)
*B64C 39/02* (2006.01)
*G05D 1/00* (2006.01)

(52) U.S. Cl.
CPC ......... *G05D 1/0808* (2013.01); *B64C 39/024* (2013.01); *G05D 1/0016* (2013.01)

(58) Field of Classification Search
CPC ... G05D 1/0808; G05D 1/0016; B64C 39/024
See application file for complete search history.

(56) References Cited

U.S. PATENT DOCUMENTS 10,139,631 B1 * 11/2018 Da Veiga ............. G05D 1/0016
2009/0222149 A1    9/2009 Murray et al.
(Continued)

FOREIGN PATENT DOCUMENTS

| CN | 102380216 A | 3/2012 |
| CN | 103605400 A | 2/2014 |

(Continued)

OTHER PUBLICATIONS

Chinese Office Action for CN Application No. 201780080836.9 dated Feb. 7, 2021 with English Translation.
(Continued)

*Primary Examiner* — Peter D Nolan
*Assistant Examiner* — Mikko Okechukwu Obioha
(74) *Attorney, Agent, or Firm* — Sughrue Mion, PLLC

(57) ABSTRACT

A drone maneuvering system includes a drone and a maneuvering signal transmitter set. The maneuvering signal transmitter set includes a first transmitter that controls at least forward, reverse, left, and right movement of the drone, and a second transmitter that controls vertical movement and rotational movement of the drone. The first transmitter includes a first auxiliary tool and transmits to the drone a maneuvering signal including tilt information of the first auxiliary tool that accompanies the actions of a pilot, in which the forward, reverse, left, and right movements of the drone are imaged. The second transmitter includes a second auxiliary tool and transmits to the drone a maneuvering signal including rotation information of the second auxiliary tool that accompanies the actions of the pilot, in which the vertical movements and rotational movements of the drone (Continued)

are imaged. The drone operates in accordance with the received maneuvering signals.

10 Claims, 4 Drawing Sheets

(56) References Cited

U.S. PATENT DOCUMENTS

| | | | | |
|---|---|---|---|---|
| 2010/0328204 | A1* | 12/2010 | Edwards | G06F 1/163 |
| | | | | 345/157 |
| 2013/0169514 | A1* | 7/2013 | Edwards | G06F 3/04815 |
| | | | | 345/8 |
| 2017/0339337 | A1* | 11/2017 | Kim | G06K 9/00724 |
| 2018/0250086 | A1* | 9/2018 | Grubbs | A61B 34/77 |
| 2019/0056733 | A1* | 2/2019 | Ferguson | B60R 21/34 |
| 2019/0137968 | A1* | 5/2019 | Ryznar | G06Q 50/04 |
| 2019/0176967 | A1* | 6/2019 | Ohata | B64C 13/20 |
| 2020/0278675 | A1* | 9/2020 | Balathandapani | B64C 39/024 |
| 2020/0339258 | A1* | 10/2020 | McLean | G06F 3/016 |

FOREIGN PATENT DOCUMENTS

| | | |
|---|---|---|
| CN | 205139708 U | 4/2016 |
| CN | 105759833 A | 7/2016 |
| CN | 106020227 A | 10/2016 |
| CN | 205692054 U | 11/2016 |
| CN | 106200657 A | 12/2016 |
| JP | 2003267295 A | 9/2003 |
| JP | 2003312592 A | 11/2003 |
| JP | 2013038622 A | 2/2013 |
| JP | 2015009709 A | 1/2015 |
| WO | 2011140606 A1 | 11/2011 |
| WO | 2012130790 A2 | 10/2012 |

OTHER PUBLICATIONS

Chinese Office Action for CN Application No. 201780080836.9 dated Jul. 3, 2020 with English Translation.

G. Rudnick et al., "Scalable Autonomy Concept for Reconnaissance UAVs on the Basis of an HTN Agent Architecture", 2016 International Conference on Unmanned Aircraft Systems (ICUAS), Jun. 7-10, 2016, pp. 40-46 (7 pages total).

X. Wang et al.,"Drone were Me; Flying Drone as Avatar by Aligned Stereo View and Head Pose", 2016 IEEE 5th Global Conference on Consumer Electronics, 2016, (2 Pages Total).

Ryo Kikuchi, et al., "Proposal of Operation Method for UAV using Head Mounted Display and Smart Device", Proceedings (4) of the 78th National Convention of IPSJ, the Information Processing Society of Japan, 2016, pp. 4-225 to 4-226 (2 pages total).

K. Higuchi et al., "Flying Head: A Head-Synchronization Mechanism for Flying Telepresence", the Information Processing Society of Japan, 2013, vol. 2013 No. 1, pp. 28-34 (7 pages total).

S. Yoshida et al., "Augmentation of the Embodied Cognition Using a Gesture-Controlled Flying Robot", the Information Processing Society of Japan, 2012, pp. 403-408, (6 page total).

Written Opinion of the International Searching Authority dated Apr. 3, 2018, in application No. PCT/JP2017/045629.

International Search Report dated Apr. 3, 2018, in application No. PCT/JP2017/045629.

\* cited by examiner

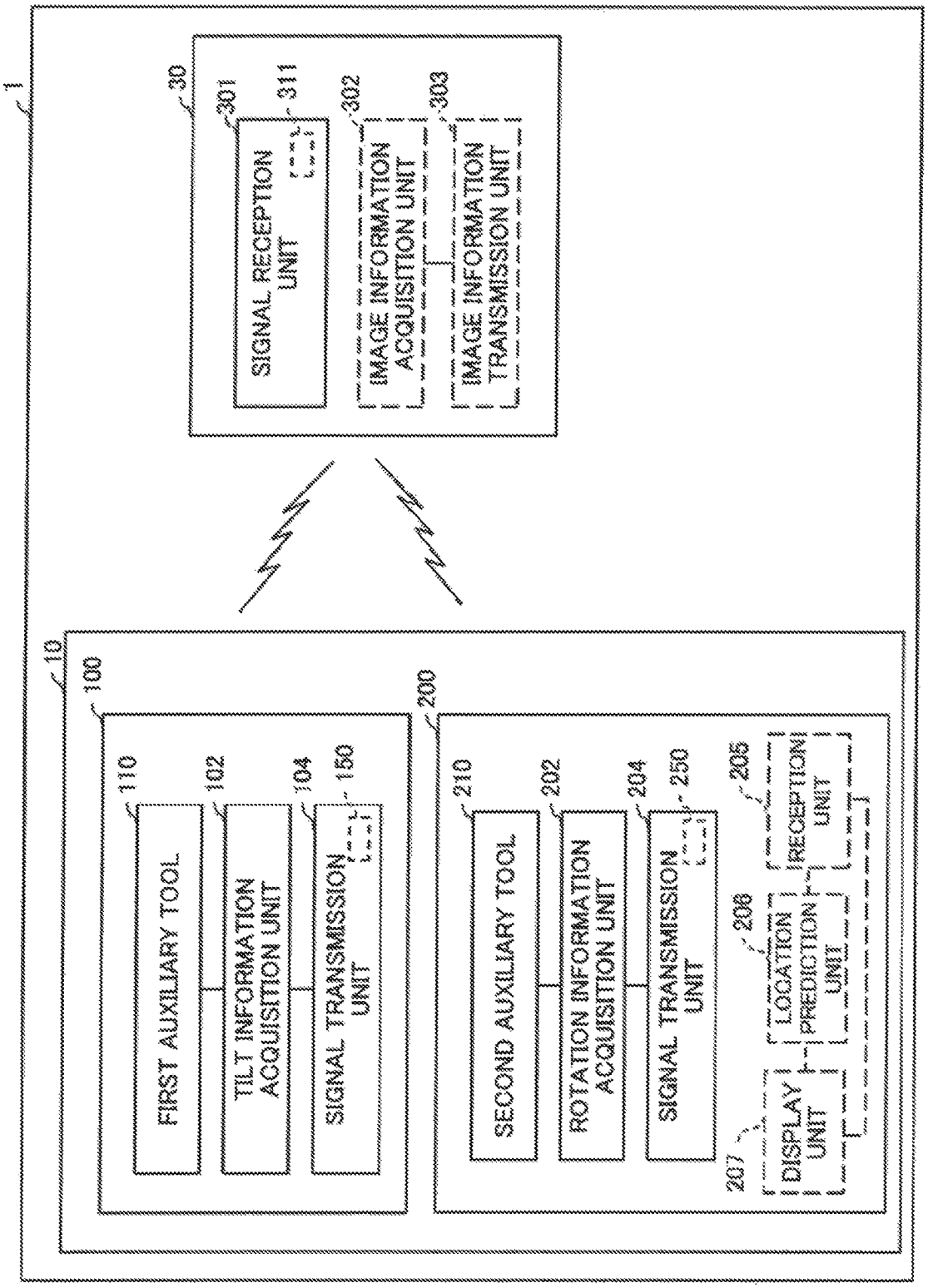

DRONE MANEUVERING SYSTEM, MANEUVERING SIGNAL TRANSMITTER SET, AND DRONE MANEUVERING METHOD

This application is a National Stage Entry of PCT/JP2017/045629 filed on Dec. 20, 2017, which claims priority from Japanese Patent Application 2016-256922 filed on Dec. 28, 2016, the contents of all of which are incorporated herein by reference, in their entirety.

TECHNICAL FIELD

The present invention relates to a device for maneuvering a drone.

BACKGROUND ART

In recent years, drones have been attempted to apply to various services rather than the other unmanned devices maneuvered by remote control. In addition, drones have become easily available even as toys for general household use. A maneuvering device of a so-called proportional method is used to maneuver a drone, and motors of the drone are controlled by moving two sticks attached to the maneuvering device, thereby controlling the movement of the drone (NPL 1). However, the maneuvering of the drone is very difficult. Thus, in the present situation, much practice has to be done in order to safely maneuver the drone.

Further, drones which can operate cameras, or can raise and lower baggage in baggage transportation are known, and the maneuvering of such drones is more complex.

CITATION LIST

Non Patent Literature

[NPL1] "Scalable Autonomy Concept for Reconnaissance UAVs on the Basis of an HTN Agent Architecture", 2016 International Conference on Unmanned Aircraft Systems (ICUAS), Jun. 7-10, 2016

SUMMARY OF INVENTION

Technical Problem

Under the circumstance, the object of the present invention is to provide a novel system for maneuvering a drone more easily.

Solution to Problem

To achieve the object, a drone maneuvering system according to the present invention includes:
a drone; and
a maneuvering signal transmitter set configured to maneuver the drone,
the maneuvering signal transmitter set includes:
a first transmitter configured to control at least forward, left, and right movement of the drone; and
a second transmitter configured to control vertical movement and rotational movement of the drone,
the drone includes
a signal reception unit that receives a maneuvering signal from the first transmitter and the second transmitter,
the first transmitter includes:
a first auxiliary tool that has a contact unit contacting with a reference surface and a fixing unit fixing a bottom of a foot of a pilot;
a tilt information acquisition unit that acquires tilt information on a tilt of the first auxiliary tool with respect to the reference surface; and
a signal transmission unit that transmits to the drone the maneuvering signal including information to instruct the drone with respect to the at least forward, left, and right movement of the drone using the acquired tilt information, and
the second transmitter includes:
a second auxiliary tool that has a wearing unit wearing on a head of the pilot;
a rotation information acquisition unit that acquires rotation information on a rotational displacement of the second auxiliary tool; and
a signal transmission unit that transmits to the drone the maneuvering signal, the maneuvering signal including information to instruct the drone with respect to the vertical movement or the rotational movement of the drone using the acquired rotation information.

A maneuvering signal transmitter set according to the present invention includes:
a first transmitter configured to control at least forward, left, and right movement of a drone; and
a second transmitter configured to control vertical movement and rotational movement of the drone,
the first transmitter includes:
a first auxiliary tool that has a contact unit contacting with a reference surface, and a fixing unit fixing a bottom of a foot of a pilot;
a tilt information acquisition unit that acquires tilt information on a tilt of the first auxiliary tool with respect to the reference surface; and
a signal transmission unit that transmits to the drone the maneuvering signal including information to instruct the drone with respect to the at least forward, left, and right movement of the drone using the acquired tilt information, and
the second transmitter includes:
a second auxiliary tool that has a wearing unit wearing on a head of the pilot;
a rotation information acquisition unit that acquires rotation information on a rotational displacement of the second auxiliary tool; and
a signal transmission unit that transmits to the drone the maneuvering signal including information to instruct the drone with respect to the vertical movement or the rotational movement of the drone using the acquired rotation information.

A drone maneuvering method according to the present invention includes:
detecting a tilt of a foot of a pilot by a tilt information acquisition unit, the tilt information acquisition unit being provided in a first auxiliary tool and detecting the tilt of the foot with respect to a reference surface, the first auxiliary tool being worn on the foot of the pilot;
transmitting to a drone a maneuvering signal, the maneuvering signal including information to instruct the drone with respect to at least forward, left, and right movement of the drone using tilt information on the tilt of the foot;
detecting a rotational displacement of a head of the pilot by a rotation information acquisition unit, the rotation information acquisition unit being provided in a second auxiliary tool and detecting the rotational displacement of the head, the second auxiliary tool being worn on the head of the pilot; and transmitting to the drone a maneuvering signal, the maneuvering signal including information to instruct the drone with respect to vertical movement or rotational movement of the drone using rotation information on the rotational displacement of the head.

Advantageous Effects of Invention

According to the present invention, a novel system for maneuvering a drone more easily can be provided. In addition, according to the present invention, the maneuvering of a drone can simply be realized without necessitating maneuvering by the hands. Moreover, according to the present invention, since the drone can be maneuvered without using the hands, when a further function is added to the drone, the maneuvering of the function can be implemented by using the free hands.

BRIEF DESCRIPTION OF DRAWINGS

FIG. 1 is a block diagram illustrating an example of a drone maneuvering system in a first example embodiment of the present invention.

EXAMPLE EMBODIMENT

Figure 2A:
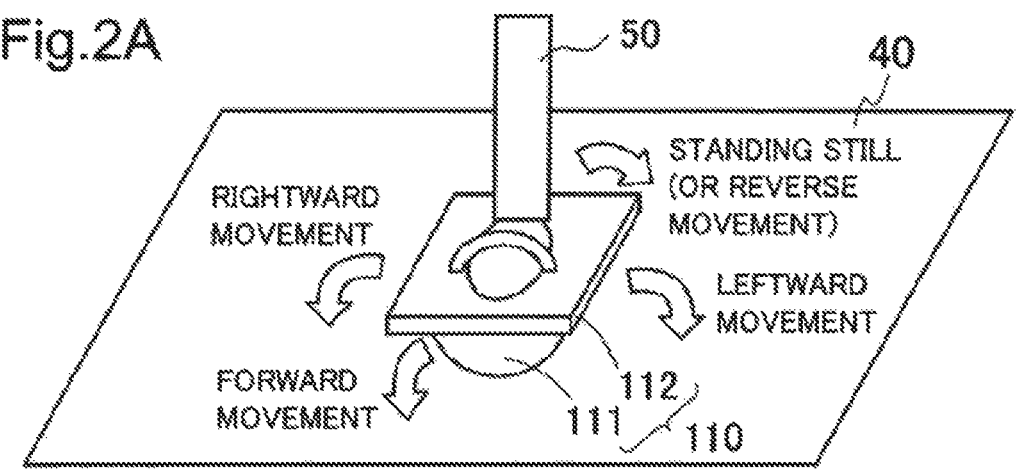
FIG. 2A is a view for describing an example of a state of generating tilt information in a first auxiliary tool due to the actions of a pilot in the first example embodiment of the present invention.

In one of modes of a drone maneuvering system, for example, tilt information on a first auxiliary tool is information on tilt of the first auxiliary tool depending on actions of a pilot. The actions of the pilot are actions with the first auxiliary tool at a predetermined position as a reference point, and actions that the pilot intended to be a drone. And rotation information on a second auxiliary tool is information on rotation of the second auxiliary tool depending on actions of a pilot. The actions of the pilot are actions with the second auxiliary tool at a predetermined position as a reference point, and actions that the pilot intended to be a drone.

In one of the modes of the drone maneuvering system, for example, a first transmitter includes the first auxiliary tool. In the first auxiliary tool, a contact unit for contact with the ground surface is a spherical body. A fixing unit is coupled to the spherical body. And a tilt information acquisition unit acquires movement information on the spherical body of the first auxiliary tool.

In one of the modes of the drone maneuvering system, for example, in the first transmitter, the tilt information on the first auxiliary tool depending on actions of the pilot includes information on a direction of movement and a degree of the movement. Movement information on the drone includes information on directions of forward, reverse, left, and right movement and degrees of the movement. And maneuvering signal information includes information on directions of forward, reverse, left, and right movement and degrees of the movement in order to instruct the drone. A second transmitter includes the second auxiliary tool. The rotation information on the second auxiliary tool depending on the actions of the pilot includes information on a direction of rotation and a degree of the rotation. Movement information on the drone includes information on a direction of vertical movement and a direction of rotational movement, and degrees of the movement. And maneuvering signal information includes information on directions of vertical movement and rotational movement and instructed degrees of the movement in order to instruct the drone.

In one of the modes of the drone maneuvering system, for example, the drone includes an image information acquisition unit which acquires image information, and an image information transmission unit which transmits the acquired image information to the second transmitter. The second transmitter includes an image information reception unit which receives the image information transmitted from the drone, and a display unit which displays the image information.

In one of the modes of the drone maneuvering system, for example, the image information transmission unit of the drone is a camera.

In one of the modes of the drone maneuvering system, for example, in the second transmitter, the display unit is a display.

In one of the modes of the drone maneuvering system, for example, the second transmitter further includes a location prediction unit which predicts a location of the drone after a predetermined time using the image information received by the image information reception unit. The display unit displays the image information received by the image information reception unit, and predicted location information acquired by the location prediction unit.

In one of modes of a maneuvering signal transmitter set, for example, tilt information on a first auxiliary tool is information on tilt of the first auxiliary tool depending on actions of a pilot. The actions of the pilot are actions with the first auxiliary tool at a predetermined position as a reference point, and actions that the pilot intended to be a drone. And rotation information on a second auxiliary tool is information on rotation of the second auxiliary tool depending on actions of a pilot. The actions of the pilot are actions with the second auxiliary tool at a predetermined position as a reference point, and actions that the pilot intended to be a drone.

In one of the modes of the maneuvering signal transmitter set, for example, in the first auxiliary tool of the first transmitter, the contact unit for contact with the ground surface is a spherical body. The fixing unit is coupled to the spherical body. And the tilt information acquisition unit acquires movement information on the spherical body in the first auxiliary tool.

In one of the modes of the maneuvering signal transmitter set, for example, in the first transmitter, the tilt information on the first auxiliary tool depending on actions of the pilot includes information on a direction of movement and a degree of the movement. Movement information on the drone includes information on directions of forward, reverse, left, and right movement and degrees of the movement. And maneuvering signal information includes information on directions of forward, reverse, left, and right movement and degrees of the movement in order to instruct the drone. A second transmitter includes the second auxiliary tool. The rotation information on the second auxiliary tool depending on the actions of the pilot includes information on a direction of rotation and a degree of the rotation. Movement information on the drone includes information on a direction of vertical movement and a direction of rotational movement, and degrees of the movement. And maneuvering signal information includes information on directions of vertical movement and rotational movement and instructed degrees of the movement in order to instruct the drone.

In one of the modes of the maneuvering signal transmitter set, for example, the second transmitter includes the image information reception unit which receives image information transmitted from the drone, and the display unit which displays the image information.

In one of the modes of the maneuvering signal transmitter set, for example, in the second transmitter, the display unit is a display.

One of the modes of the maneuvering signal transmitter set includes, for example, an information acquisition terminal and a server. The terminal and the server are connectable via a communication network. The terminal includes a tilt information acquisition unit and a rotation information acquisition unit. The server includes a storage, a converter unit, and a signal transmission unit.

In one of the modes of the maneuvering signal transmitter set, for example, the second transmitter further includes the location prediction unit which predicts the location of the drone after a predetermined time using the image information received by the image information reception unit. The display unit displays the image information received by the image information reception unit, and predicted location information acquired by the location prediction unit.

In one of drone maneuvering methods, for example, tilt information on a first auxiliary tool is information on tilt of the first auxiliary tool depending on actions of a pilot. The actions of the pilot are actions with the first auxiliary tool at a predetermined position as a reference point, and actions that the pilot intended to be a drone. And rotation information on a second auxiliary tool is information on rotation of the second auxiliary tool depending on actions of a pilot. The actions of the pilot are actions with the second auxiliary tool at a predetermined position as a reference point, and actions that the pilot intended to be a drone.

In one of the drone maneuvering methods, for example, in the first auxiliary tool of the first transmitter, the contact unit for contact with the ground surface is a spherical body. The fixing unit is coupled to the spherical body. And the tilt information acquisition unit acquires movement information on the spherical body in the first auxiliary tool.

In one of the drone maneuvering methods, for example, in the first transmitter, the tilt information on the first auxiliary tool depending on actions of the pilot includes information on a direction of movement and a degree of the movement. Movement information on the drone includes information on directions of forward, reverse, left, and right movement and degrees of the movement. And maneuvering signal information includes information on directions of forward, reverse, left, and right movement and degrees of the movement in order to instruct the drone. A second transmitter includes the second auxiliary tool. The rotation information on the second auxiliary tool depending on the actions of the pilot includes information on a direction of rotation and a degree of the rotation. Movement information on the drone includes information on a direction of vertical movement and a direction of rotational movement, and degrees of the movement. And maneuvering signal information includes information on directions of vertical movement and rotational movement and instructed degrees of the movement in order to instruct the drone.

One of the drone maneuvering methods includes an image information acquisition step of acquiring image information from the drone, an image information transmission step of transmitting the image information acquired from the drone to the second transmitter, an image information reception step of receiving the image information transmitted from the drone by the second transmitter, and a display step of displaying the image information by the second transmitter.

In one of the drone maneuvering methods, for example, in the image information acquisition step, a camera acquires the image information.

In one of the drone maneuvering methods, for example, in the display step, a display displays the image information.

One of the drone maneuvering methods, for example, further includes a location prediction step of predicting the location of the drone after a predetermined time using the image information received by the second transmitter in the image information reception step. In the display step, the image information received in the image information reception step and predicted location information acquired by the location prediction step are displayed.

Hereinafter, example embodiments according to the present invention will be described with reference to the accompanying drawings. The present invention is not limited to the example embodiments to be described below. In the respective drawings, the components of the same name are denoted by the same reference sign, and a description of common structural components is omitted.

First Example Embodiment

A first example embodiment relates to a drone maneuvering system, a maneuvering signal transmitter set, and a drone maneuvering method according to the present invention.

FIG. 1 is a block diagram illustrating a simplified configuration of the drone maneuvering system in the first example embodiment. As illustrated in FIG. 1, a drone maneuvering system 1 of the first example embodiment includes a maneuvering signal transmitter set 10, and a drone 30. The maneuvering signal transmitter set 10 includes a first transmitter 100 which controls at least forward, left, and right movement of the drone 30, and a second transmitter 200 which controls vertical movement and rotational movement of the drone 30. The first transmitter 100 and second transmitter 200 can connect with the drone 30 by wireless communication.

The drone 30 is an aircraft (i.e. an unmanned aerial vehicle (flying object)) which can fly by remote wireless maneuvering by a pilot. For example, the drone 30 is a multi-copter such as a quadricopter. Note that the drone, in this context, is assumed to include an unmanned aerial vehicle having not only a flying mode in which the unmanned aerial vehicle flies by wireless maneuvering by the pilot, but also a flying mode in which the unmanned aerial vehicle can fly autonomously.

The drone 30 includes a signal reception unit 301. A part of functions of the signal reception unit 301 is realized by, for example, a central processing unit (CPU) 311.

In the first example embodiment, the maneuvering signal transmitter set 10 includes the first transmitter 100 and the second transmitter 200. The first transmitter 100 includes a first auxiliary tool 110, a tilt information acquisition unit 102, and a signal transmission unit 104. The second transmitter 200 includes a second auxiliary tool 210, a rotation information acquisition unit 202, and a signal transmission unit 204. The first transmitter 100 is, for example, a device (terminal) in which the first auxiliary tool 110, tilt information acquisition unit 102 and signal transmission unit 104 are integrated. The second transmitter 200 is, for example, a device (terminal) in which the second auxiliary tool 210, rotation information acquisition unit 202 and signal transmission unit 204 are integrated.

Figure 2B:
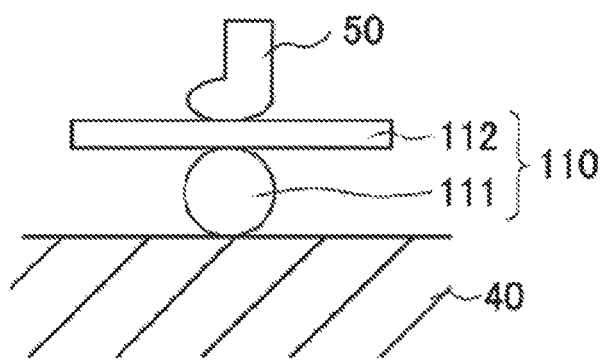
FIG. 2B is a schematic view at a time when the first auxiliary tool attached to the pilot's foot is viewed from the left side.

The first auxiliary tool 110 of the first transmitter 100 includes a contact unit to contact with a reference surface, and a fixing unit to fix a bottom of the pilot's foot. For example, as illustrated in FIG. 2A and FIG. 2B, in the first auxiliary tool 110, the contact unit to contact with a reference surface 40 is a spherical body 111. A fixing unit 112 is coupled to the spherical body 111. The spherical body 111, for example, may be or may not be a perfect sphere, and may be, for instance, a hemi-sphere or the like. In the case of this form, tilt information on the first auxiliary tool 110 depending on the actions of the pilot can easily be acquired. The number of first auxiliary tools 110 included in the first transmitter 100 is, for example, one or more. Specifically, the first transmitter 100, for example, may be designed for use by one foot, or for use by both feet. In the latter case, for example, the first transmitter 100 includes a pair of first auxiliary tools 110 for the right foot and left foot. Note that a reference sign 50 in FIG. 2A and FIG. 2B denotes the pilot's foot.

The tilt information acquisition unit 102 includes a configuration to acquire tilt information on a tilt of the first auxiliary tool 110 with respect to the reference surface 40. The tilt information acquisition unit 102 is a sensor. The sensor is mounted, for example, on the contact unit (spherical body) 111 or the fixing unit 112 of the first auxiliary tool 110, and detects the movement of the contact unit 111 or the fixing unit 112 as a tilt of the first auxiliary tool 110. The sensor is, for example, a gyro sensor, an acceleration sensor, or the like.

Note that, when the tilt information acquisition unit 102 acquires the movement information of the spherical body 111, the tilt information acquisition unit 102 may detect rotation of the spherical body 111, or may detect a two-dimensional positional displacement of the contact position of the surface of the spherical body 111 with the reference surface 40.

The signal transmission unit 104 includes a configuration to transmit to the drone 30 a maneuvering signal which instructs an operation of the drone 30. The maneuvering signal is a signal based on the tilt information acquired by the tilt information acquisition unit 102, and includes, for example, information on the direction of movement of the drone 30, such as forward, left, and right movement, and standing still of the drone 30, and information of the degree of the movement. Here, the maneuvering signal includes information to interlock the movement of the drone 30 (the direction and velocity of travel) with the movement of the pilot's foot (the direction and degree of the tilt), such that when the pilot's foot tilts to the right, for example, the maneuvering signal on an instruction to move the drone 30 to the right. Note that a part of functions of the signal transmission unit 104 may be realized by a CPU 150. In this case, for example, the signal transmission unit 104 includes a storage (not illustrated). The storage is, for example, a random access memory (RAM), a read only memory (ROM), a flash memory, a hard disk (HD), an optical disc, a floppy (trademark) disk (FD), or the like.

The second transmitter 200 includes the second auxiliary tool 210, a rotation information acquisition unit 202, and a signal transmission unit 204.

Figure 2C:
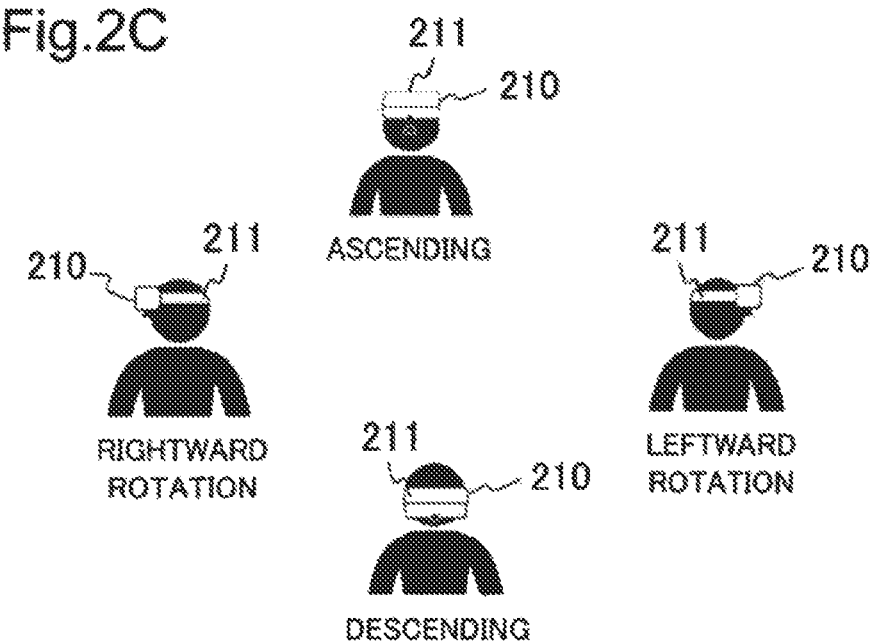
FIG. 2C is a view for describing an example of a state of generating rotation information in a second auxiliary tool due to the actions of the pilot in the first example embodiment of the present invention.

As illustrated in FIG. 2C, the second auxiliary tool 210 includes a wearing unit 211 for wearing on the head of the pilot. A part of the pilot's head where the wearing unit 211 is worn is, for example, the top of the head, forehead, eyes, the entirety of the head, or the like. Note that the second auxiliary tool 210 may be a wearable display (head mounted display) including a display unit.

The rotation information acquisition unit 202 includes a configuration to acquire rotation information on a rotational displacement of the second auxiliary tool 210. Specifically, the rotation information acquisition unit 202 is a sensor which is mounted, for example, on the second auxiliary tool 210, and which detects the rotation of the second auxiliary tool 210. The sensor is, for example, a gyro sensor, an acceleration sensor, or the like.

The signal transmission unit 204 includes a configuration to transmit to the drone 30 a maneuvering signal which instructs the operation of the drone 30. The maneuvering signal is a signal based on the rotation information acquired by the rotation information acquisition unit 202, and includes, for example, information on vertical movement and rotational movement of the drone 30, and information of the degree of the movement. Here, the maneuvering signal includes information to interlock the movement of the drone 30 (the direction of rotation) with the rotation of the pilot's head (the direction of rotation and the speed of rotation). Note that a part of functions of the signal transmission unit 204 may be realized by a CPU 250. In this case, for example, the signal transmission unit 204 includes a storage (not illustrated). The storage is, for example, a random access memory (RAM), a read only memory (ROM), a flash memory, a hard disk (HD), an optical disc, a floppy (trademark) disk (FD), or the like.

The drone 30 includes a signal reception unit 301. The signal reception unit 301 includes a function of receiving maneuvering signal from the first transmitter 100 and second transmitter 200, and controlling the operation of the drone 30 based on the received maneuvering signal. A part of functions of the signal reception unit 301 is realized, for example, by a CPU 311. In addition, the signal reception unit 301 includes a storage (not illustrated) which stores a computer program that is executed by the CPU 311, and data.

The drone maneuvering system 1 of the first example embodiment is configured as described above. In the meantime, in the maneuvering method of the drone in NPL 1, the motors of respective propellers are controlled by the two sticks of the maneuvering device. By the movement of the motors, the movement of the drone, such as forward, reverse, left, and right movement, rotational movement, and standing still, is controlled. Specifically, the pilot cannot well maneuver the drone, unless the pilot masters the relationship between the movement of the two sticks of the maneuvering device and the corresponding movement of the drone. On the other hand, a human cannot fly by using his/her body. However, for example, from movies, picture books, comics, animation, etc., many people have images relating to actions (e.g. posture, pose, etc.) in the case of flying by using their bodies. Thus, for example, the actions, which a human images with respect to various movements relating to the maneuvering of a flying object, and the movement of the drone can be associated. Taking this into account, in the first example embodiment, in the state in which the pilot wears the first auxiliary tool 110 and second auxiliary tool 210, maneuvering signals for instructing the drone 30 are generated based on the relationship between the tilt information of the first auxiliary tool 110 and the rotation information of the second auxiliary tool 210 depending on the actions of the pilot, in which flight is imaged, and the corresponding movement of the drone 30. Further, the maneuvering signals are transmitted from the maneuvering signal transmitter set 10 to the drone 30, and the movement of the drone 30 is controlled. Thereby, the pilot can maneuver the drone 30 by taking actions which the pilot images in the state in which the pilot wears the first auxiliary tool 110 and second auxiliary tool 210. In short, the drone maneuvering system 1 in the first example embodiment enables simple drone maneuvering. By contrast, in the case of the maneuvering device in NPL 1, for example, fine movements of the two sticks and the combination of movements have to be memorized, and the maneuvering is very difficult. On the other hand, the actions relating to the maneuvering of a flying object which a human images are easy to memorize for the pilot, and, even when a quick decision is needed, the body easily reacts naturally, and maneuvering becomes simpler.

FIG. 2A illustrates an example of the relationship between the tilt information of the first auxiliary tool 110 depending on the actions of the pilot and the associated movement of the drone 30. FIG. 2C illustrates an example of the relationship between the rotation information of the second auxiliary tool 210 depending on the actions of the pilot and the associated movement of the drone 30.

As illustrated in FIG. 2A and FIG. 2B, the first auxiliary tool 110 includes the contact unit 111 to contact with the reference surface 40, and the fixing unit 112 to fix a foot 50 of the pilot. The contact unit 111 is a spherical body, and the fixing unit 112 is coupled to the spherical body. The first auxiliary tool 110 incorporates, as the tilt information acquisition unit 102, a gyro sensor which detects the rotation of the spherical body. In addition, as illustrated in FIG. 2A, for example, the state in which the pilot wearing the first auxiliary tool 110 applies the center of gravity to the toe-side of the foot 50, i.e. the state in which the first auxiliary tool 110 is tilted toward the viewer side of the drawing sheet of the Figure, corresponds to forward movement of the drone. The state in which the pilot applies the center of gravity to the right side of the foot 50, i.e. the state in which the first auxiliary tool 110 is tilted toward the right side (the left side in the Figure), corresponds to rightward movement of the drone. The state in which the pilot applies the center of gravity to the left side of the foot 50, i.e. the state in which the first auxiliary tool 110 is tilted toward the left side (the right side in the Figure), corresponds to leftward movement of the drone. The state in which the pilot applies the center of gravity to the heel side of the foot 50, i.e. the state in which the first auxiliary tool 110 is tilted toward the depth side of the drawing sheet of the Figure, may correspond to reverse movement of the drone, or may correspond to hovering (standing still in the position) of the drone. Besides, in FIG. 2A, for example, the degree of the tilt of the first auxiliary tool 110 corresponds to the velocity, and the drone can be moved at higher velocity by increasing the tilt of the first auxiliary tool 110 and can be moved at lower velocity by decreasing the tilt of the first auxiliary tool 110.

The second auxiliary tool 210 incorporates, as the rotation information acquisition unit 202, a gyro sensor which detects the rotation of the second auxiliary tool 210. The pilot can rotate the second auxiliary tool 210 by directing the head in upward and downward directions and in left and right directions, or by tilting the head in left and right directions. In addition, as illustrated in FIG. 2C, for example, the state in which the pilot wearing the second auxiliary tool 210 directs the face in the upward direction corresponds to ascending of the drone, and the state in which the pilot directs the face in the downward direction corresponds to descending of the drone. The state in which the pilot directs the face to the right corresponds to rotation to the right of the drone (a turn to the right), and the state in which the pilot directs the face to the left corresponds to rotation to the left of the drone (a turn to the left). The state in which the pilot tilts the face to the right corresponds to rightward rotation of the drone (rightward rotation around the axis of the direction of travel of the drone), and the state in which the pilot tilts the face to the left corresponds to leftward rotation of the drone (leftward rotation around the axis of the direction of travel of the drone). Besides, in FIG. 2C, for example, the rotational angle of the second auxiliary tool 210 corresponds to the speed of rotation or the like of the drone. By increasing the rotational angle, the drone can be quickly rotated, for example. Note that in the above-described example, although the rotational angle of the second auxiliary tool 210 corresponds to the speed of rotation or the like of the drone, the rotational speed of the second auxiliary tool 210, for example, may correspond to the speed of rotation or the like of the drone. In addition, in FIG. 2C, for example, the rotation or the like of the drone may not be started before the rotational angle exceeds an angle as a threshold, and the rotation or the like of the drone may be started when the rotational angle has exceeded the threshold. Furthermore, for example, the rotation or the like of the drone may not be started before the rotational speed exceeds a speed as a threshold, and the rotation or the like of the drone may be started when the rotational speed has exceeded the speed. In this case, by moving the head at a slow speed below the threshold, the direction of the head can be varied without changing the operational state of the drone.

The rotation information acquisition unit 202 (second auxiliary tool 210) can maneuver the drone, in cooperation with the above-described tilt information acquisition unit 102 (first auxiliary tool 110). The pilot wears the first auxiliary tool 110 and second auxiliary tool 210, and performs maneuvering. In this case, the maneuvering of the first auxiliary tool 110 by the pilot is, for example, as has been described above. The pilot wearing the second auxiliary tool 210 can move the drone upward by directing the face upward. The pilot can move the drone downward by directing the face downward. The pilot can turn the drone to the right by directing the face to the right. The pilot can turn the drone to the left by directing the face to the left. The pilot can rotate the body of the drone rightward by directing the face forward while tilting the face rightward. The pilot can rotate the body of the drone leftward by directing the face forward while tilting the face leftward.

Figure 3:
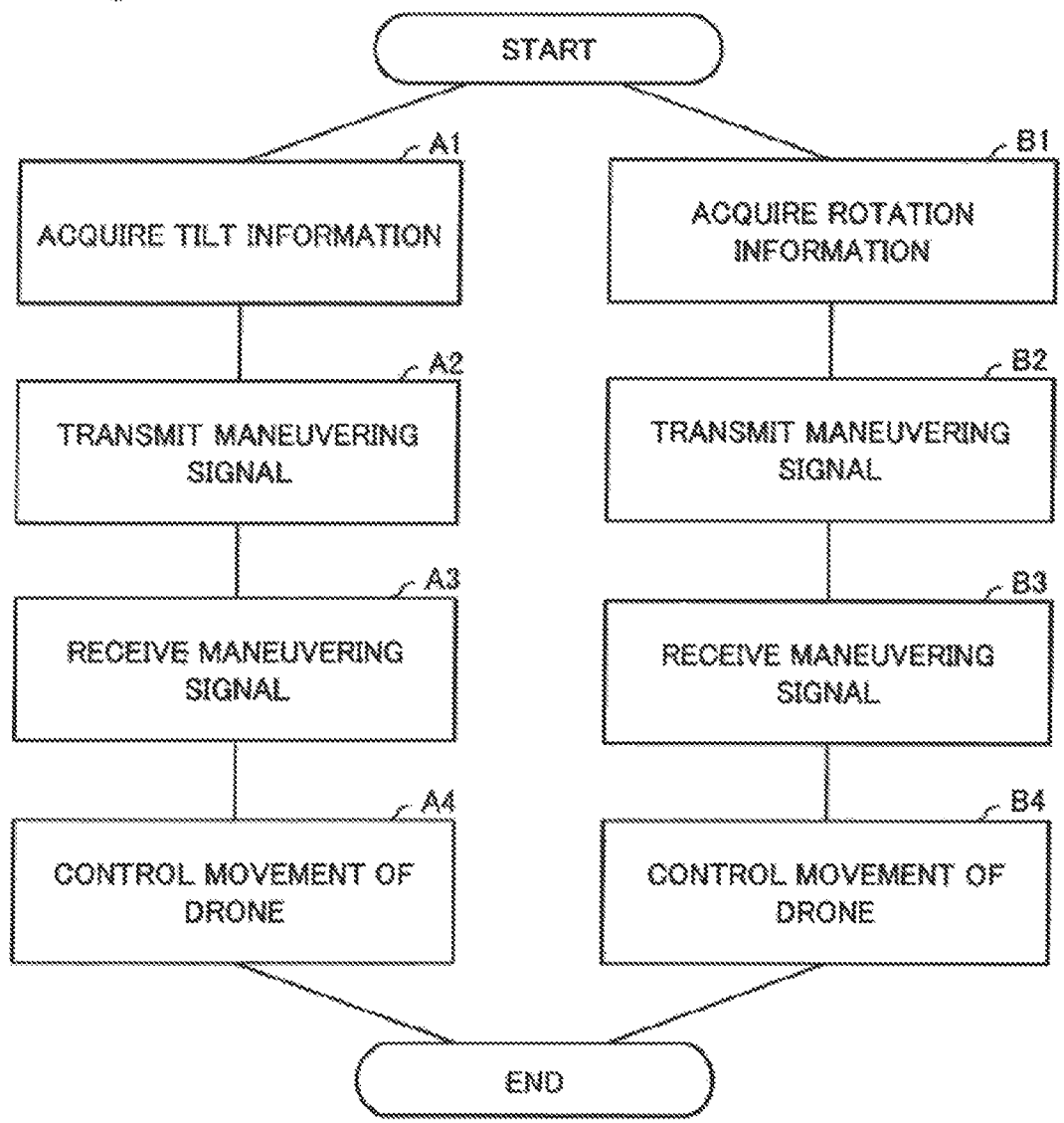
FIG. 3 is a flowchart for describing an example of a drone maneuvering method in the first example embodiment of the present invention.

Next, FIG. 3 illustrates a flowchart of a drone maneuvering method in the first example embodiment. The drone maneuvering method of the first example embodiment is implemented as follows, for example, by using the drone maneuvering system of FIG. 1.

Here, A1 step to A4 step and B1 step to B4 step in FIG. 3 are executed in parallel.

(A1) Acquiring the Tilt Information.

In A1 step, the tilt information acquisition unit 102 of the first transmitter 100 acquires the tilt information on the first auxiliary tool 110 depending on the actions of the pilot by detecting the movement of the first auxiliary tool 110 depending on the actions of the pilot.

(A2) Transmitting the Maneuvering Signal.

In A2 step, the signal transmission unit 104 of the first transmitter 100 transmits to the drone 30 the maneuvering signal based on the acquired tilt information.

(A3) Receiving the Maneuvering Signal.

In A3 step, the signal reception unit 301 of the drone 30 receives the maneuvering signal from the signal transmission unit 104.

(A4) Controlling the Movement of the Drone.

In A4 step, the signal reception unit 301 of the drone 30 controls the movement of the drone 30 in accordance with the maneuvering signal received from the signal transmission unit 104.

(B1) Acquiring the Rotation Information.

In B1 step, the rotation information acquisition unit 202 of the second transmitter 200 acquires the rotation information on the second auxiliary tool 210 depending on the actions of the pilot by detecting the movement of the second auxiliary tool 210 depending on the actions of the pilot.

(B2) Transmitting the Maneuvering Signal

In B2 step, the signal transmission unit 204 of the second transmitter 200 transmits to the drone 30 the maneuvering signal based on the acquired rotation information.

(B3) Receiving the Maneuvering Signal.

In B3 step, the signal reception unit 301 of the drone 30 receives the maneuvering signal from the signal transmission unit 204.

(B4) Controlling the Movement of the Drone.

In B4 step, the signal reception unit 301 of the drone 30 controls the movement of the drone 30 in accordance with the maneuvering signal received from the signal transmission unit 204.

The drone maneuvering system, the maneuvering signal transmitter set and the drone maneuvering method of the first example embodiment have the configuration in which the drone 30 operates in interlock with the movements of the foot and head of the pilot. This makes it easier for the pilot to maneuver the drone 30 as the pilot images the movement of the drone 30.

Modification

Next, a modification of the maneuvering signal transmitter set 10 will be illustrated. Specifically, each of the first transmitter 100 and the second transmitter 200 included in the maneuvering signal transmitter set 10 is not limited to the mode of the above-described single device (terminal, auxiliary tool), and may be composed of, for example, a plurality of devices. In a concrete example, each of the first transmitter 100 and the second transmitter 200 may be composed of two independent terminals which can be communicably connected. In this case, in the first transmitter 100, for example, one terminal is the first auxiliary tool 110 including the tilt information acquisition unit 102, and the other terminal includes the signal transmission unit 104. In addition, in the second transmitter 200, for example, one terminal is the second auxiliary tool 210 including the rotation information acquisition unit 202, and the other terminal includes the signal transmission unit 204.

Figure 4:
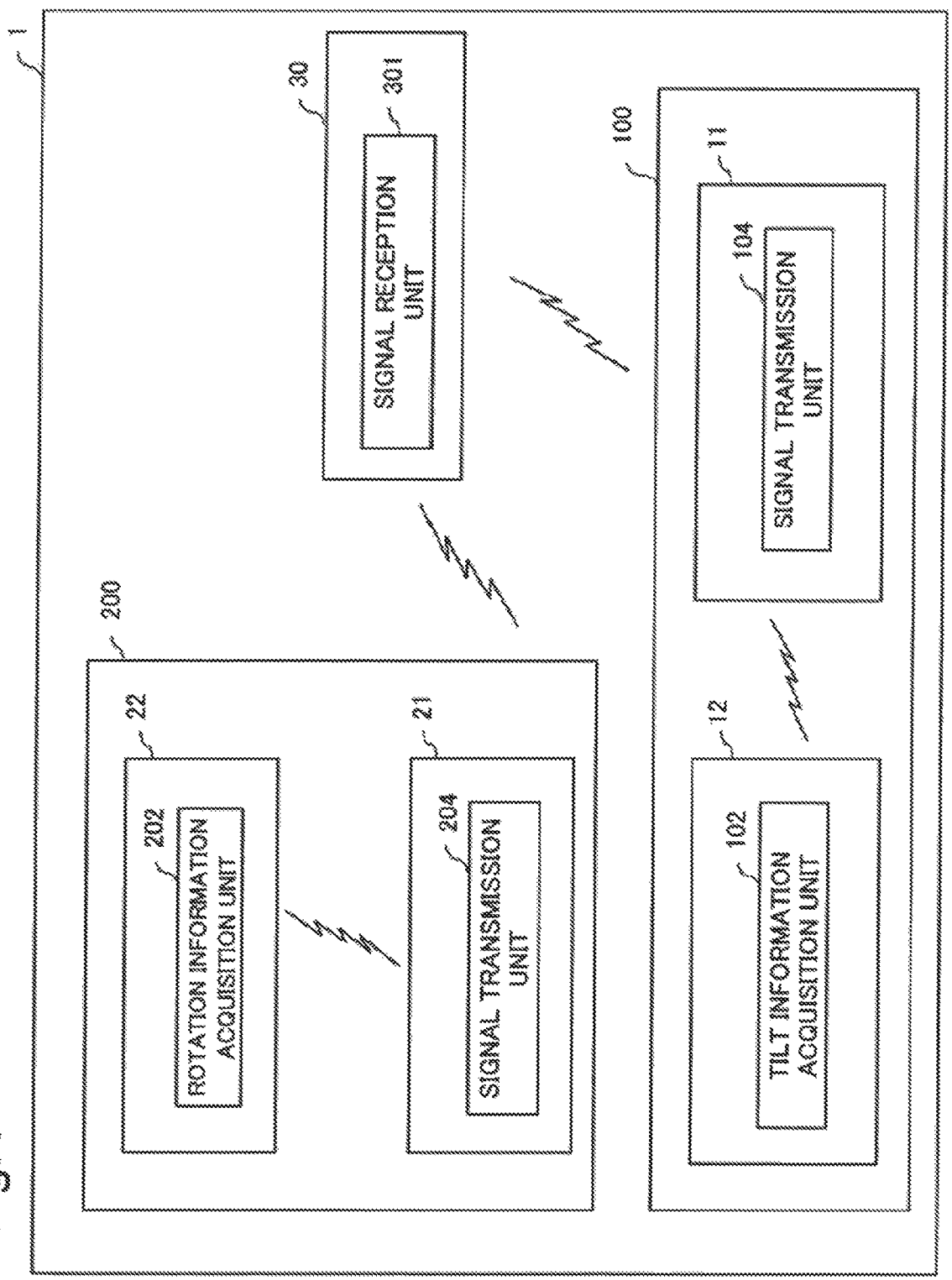
FIG. 4 is a block diagram illustrating an example of a maneuvering signal transmitter set in a modification of the first example embodiment.

FIG. 4 is a block diagram illustrating, in a simplified manner, the configurations of the first transmitter 100 and the second transmitter 200 in the modification. As illustrated in FIG. 4, the first transmitter 100 includes a main body (e.g. a server) 11 and a terminal 12. The main body 11 and the terminal 12 can be connected by wire or by radio. In addition, the second transmitter 200 includes a main body (e.g. a server) 21 and a terminal 22. The main body 21 and the terminal 22 can be connected by wire or by radio. The main body 11 includes the signal transmission unit 104. On the other hand, the main body 21 includes the signal transmission unit 204. The terminal 12 is the first auxiliary tool 110, and includes the tilt information acquisition unit 102. The terminal 22 is the second auxiliary tool 210, and includes the rotation information acquisition unit 202. Note that the main body 11 and the main body 21 may be composed of a common device (server).

Second Example Embodiment

In a drone maneuvering system 1 of a second example embodiment, the second transmitter 200 further includes a reception unit 205 of being an image information reception unit, and a display unit 206 which are indicated by dotted lines in FIG. 1. And the drone 30 further includes an image information acquisition unit 302 and an image information transmission unit 303. Note that, in the description of the second example embodiment, the same structural parts as in the first example embodiment are denoted by like reference signs, and an overlapping description of the common parts is omitted.

The image information acquisition unit 302 acquires image information. The image information is, for example, a moving image (video). The image information acquisition unit 302 is composed of, for example, a camera, and is mounted on the drone 30. The camera which constitutes the image information acquisition unit 302 may be, for example, a camera for capturing one direction, or a 360° camera for capturing all directions.

The image information transmission unit 303 transmits the image information acquired by the image information acquisition unit 302 to the second transmitter 200. A part of functions of the image information transmission unit 303 is realized by, for example, a CPU.

The reception unit 205 of the second transmitter 200 receives the image information transmitted from the drone 30. A part of functions of the reception unit 205 is realized by, for example, a CPU.

The display unit 207 displays the received image information. For example, when the second auxiliary tool 210 is a mode of a wearable display (head mounted display) which is worn on the head of the pilot, the display functions also as the display unit 207.

The drone maneuvering system 1 of the second example embodiment can display the image information acquired by the image information acquisition unit 302 of the drone 30 by the display unit 205 of the second transmitter 200 which is present near the pilot. Thereby, the pilot can easily acquire the condition of the vicinity of the drone 30, and can make easier the maneuvering of the drone 30.

Third Example Embodiment

In a drone maneuvering system 1 of a third example embodiment, in addition to the configuration of the second example embodiment, the second transmitter 200 further includes a location prediction unit 206 indicated by a dotted line in FIG. 1.

The location prediction unit 206 predicts a flight location or a flight route of the drone 30 after a predetermined time using the image information received from the drone 30 by the reception unit 205. The location prediction unit 206 is realized by, for example, a CPU.

In the third example embodiment, the display unit 207 displays not only the image information received from the drone 30, but also the flight location or the flight route of the drone 30 which is predicted by the location prediction unit 206.

Since the drone maneuvering system 1 of the third example embodiment predicts the flight location or the flight route of the drone 30 and displays the predicted flight location or the flight route on the display unit 207, the maneuvering of the drone 30 by the pilot can be made easier.

Although the present invention has been described above with reference to the example embodiments, the present invention is not limited to the above example embodiments. Various modifications, which are understandable by a skilled person within the scope of the present invention, can be made to the configurations and details of the present invention The present application claims priority based on Japanese Patent Application No. 2016-256922, filed Dec. 28, 2016; the entire contents of which are incorporated herein by reference.

REFERENCE SIGNS LIST

1 Drone maneuvering system
10 Maneuvering signal transmitter set
100 First transmitter
200 Second transmitter
30 Drone
110 First auxiliary tool
102 Tilt information acquisition unit
104 Signal transmission unit
210 Second auxiliary tool
202 Rotation information acquisition unit
204 Signal transmission unit
301 Signal reception unit

What is claimed is:

1. A drone maneuvering system comprising:
a drone; and
a maneuvering signal transmitter set configured to maneuver the drone,
the maneuvering signal transmitter set comprising:
a first transmitter configured to control at least forward, left, and right movement of the drone; and
a second transmitter configured to control vertical movement and rotational movement of the drone,
the drone comprising
a signal receptor that receives a maneuvering signal from the first transmitter and the second transmitter,
the first transmitter comprising:
a first auxiliary tool, the first auxiliary tool having a contact part that contacts with a reference surface, and a fixing part that fixes a bottom of a foot of a pilot;
a tilt information detector that acquires tilt information on a tilt of the first auxiliary tool with respect to the reference surface; and
a signal transmitter that transmits to the drone the maneuvering signal, the maneuvering signal including information to instruct the drone with respect to the at least forward, left, and right movement of the drone using the acquired tilt information, and
the second transmitter comprising:
a second auxiliary tool, the second auxiliary tool having a fitting part to wear on a head of the pilot;
a rotation information detector that acquires rotation information on a rotational displacement of the second auxiliary tool; and
a signal transmitter that transmits to the drone the maneuvering signal, the maneuvering signal including information to instruct the drone with respect to the vertical movement or the rotational movement of the drone using the acquired rotation information,
wherein the contact parts of the first auxiliary tool in the first transmitter is a spherical body, and the fixing parts is coupled to the spherical body, and
the tilt information detector acquires movement information of the spherical body in the first auxiliary tool.

2. The drone maneuvering system according to claim 1, wherein the drone comprises:
an image device that acquires acquiring image information; and
an image transmitter that transmits the acquired image information to the second transmitter, and
wherein the second transmitter further comprises:
an image receiver that receives the image information transmitted from the drone; and
a display device that displays the image information.

3. The drone maneuvering system according to claim 2, wherein the image device of the drone is a camera.

4. The drone maneuvering system according to claim 2, wherein the display device in the second transmitter is a display.

5. A drone maneuvering system comprising:
a drone; and
a maneuvering signal transmitter set configured to maneuver the drone,
the maneuvering signal transmitter set comprising:
a first transmitter configured to control at least forward, left, and right movement of the drone; and
a second transmitter configured to control vertical movement and rotational movement of the drone,
the drone comprising
a signal receptor that receives a maneuvering signal from the first transmitter and the second transmitter,
the first transmitter comprising:
a first auxiliary tool, the first auxiliary tool having with a reference surface and a fixing parts that fixes a bottom of a foot of a pilot;
a tilt information detector that acquires tilt information on a tilt of the first auxiliary tool with respect to the reference surface; and
a signal transmitter that transmits to the drone the maneuvering signal, the maneuvering signal including information to instruct the drone with respect to the at least forward, left, and right movement of the drone using the acquired tilt information, and
the second transmitter comprising:
a second auxiliary tool, the second auxiliary tool having a fitting parts to wear on a head of the pilot;
a rotation information detector that acquires rotation information on a rotational displacement of the second auxiliary tool; and
a signal transmitter that transmits to the drone the maneuvering signal, the maneuvering signal including information to instruct the drone with respect to the vertical movement or the rotational movement of the drone using the acquired rotation information,
wherein the drone comprises:

an image device that acquires acquiring image information; and an image transmitter that transmits the acquired image information to the second transmitter, and wherein the second transmitter further comprises:

an image receiver that receives the image information transmitted from the drone; and a display device that displays the image information, wherein the second transmitter further comprises a processor configured to predict a flight location of the drone or a flight route of the drone after a predetermined time using the received image information, and wherein the display device further displays the predicted flight location or the predicted flight route.

6. A maneuvering signal transmitter set comprising:

a first transmitter configured to control at least forward, left, and right movement of a drone; and a second transmitter configured to control vertical movement and rotational movement of the drone, the first transmitter comprising:

a first auxiliary tool, the first auxiliary tool having a contact part that contacts with a reference surface, and a fixing part that fixes a bottom of a foot of a pilot;

a tilt information detector that acquires tilt information on a tilt of the first auxiliary tool with respect to the reference surface; and a signal transmitter that transmits to the drone the maneuvering signal, the maneuvering signal including information to instruct the drone with respect to the at least forward, left, and right movement of the drone using the acquired tilt information, and the second transmitter comprising:

a second auxiliary tool, the second auxiliary tool having a fitting part to wear on a head of the pilot;

a rotation information detector that acquires rotation information on a rotational displacement of the second auxiliary tool; and a signal transmitter that transmits to the drone the maneuvering signal, the maneuvering signal including information to instruct the drone with respect to the vertical movement or the rotational movement of the drone using the acquired rotation information, wherein the contact parts of the first auxiliary tool in the first transmitter is a spherical body, and the fixing parts is coupled to the spherical body, and the tilt information detector acquires movement information of the spherical body in the first auxiliary tool.

7. The maneuvering signal transmitter set according to claim 6, wherein the tilt information detector of the first transmitter is provided in a first terminal device, the first terminal is equipped to the first auxiliary tool, and the signal transmitter of the first transmitter is provided in a server which is communicably connected to the first terminal device, and wherein the rotation information detector of the second transmitter is provided in a second terminal device, the second terminal is equipped to the second auxiliary tool, and the signal transmitter of the second transmitter is provided in a server which is communicably connected to the second terminal device.

8. A drone maneuvering method comprising:

detecting a tilt of a foot of a pilot by a tilt information detector as a movement of a spherical body, the tilt information detector being provided in a first auxiliary tool and detecting the tilt of the foot with respect to a reference surface, the first auxiliary tool being worn on the foot of the pilot through the spherical body;

transmitting to a drone a maneuvering signal, the maneuvering signal including information to instruct the drone with respect to at least forward, left, and right movement of the drone using tilt information on the tilt of the foot;

detecting a rotational displacement of a head of the pilot by rotation information detector, the rotation information detector being provided in a second auxiliary tool and detecting the rotational displacement of the head, the second auxiliary tool being worn on the head of the pilot; and transmitting to the drone a maneuvering signal, the maneuvering signal including information to instruct the drone with respect to vertical movement or rotational movement of the drone using rotation information on the rotational displacement of the head.

9. A maneuvering signal transmitter set comprising:

a first transmitter configured to control at least forward, left, and right movement of a drone; and a second transmitter configured to control vertical movement and rotational movement of the drone, the first transmitter comprising:

a first auxiliary tool, the first auxiliary tool having a contact parts that contacts with a reference surface, and a fixing parts that fixes a bottom of a foot of a pilot;

a tilt information detector that acquires tilt information on a tilt of the first auxiliary tool with respect to the reference surface; and a signal transmitter that transmits to the drone the maneuvering signal, the maneuvering signal including information to instruct the drone with respect to the at least forward, left, and right movement of the drone using the acquired tilt information, and the second transmitter comprising:

a second auxiliary tool, the second auxiliary tool having a fitting parts to wear on a head of the pilot;

a rotation information detector that acquires rotation information on a rotational displacement of the second auxiliary tool; and a signal transmitter that transmits to the drone the maneuvering signal, the maneuvering signal including information to instruct the drone with respect to the vertical movement or the rotational movement of the drone using the acquired rotation information, wherein the second transmitter further comprises a processor configured to predict a flight location of the drone or a flight route of the drone after a predetermined time using the received image information, and wherein the display device further displays the predicted flight location or the predicted flight route.

10. A drone maneuvering method comprising:

detecting a tilt of a foot of a pilot by a tilt information detector, the tilt information detector being provided in a first auxiliary tool and detecting the tilt of the foot with respect to a reference surface, the first auxiliary tool being worn on the foot of the pilot;

transmitting to a drone a maneuvering signal, the maneuvering signal including information to instruct the drone with respect to at least forward, left, and right movement of the drone using tilt information on the tilt of the foot;

detecting a rotational displacement of a head of the pilot by rotation information detector, the rotation information detector being provided in a second auxiliary tool and detecting the rotational displacement of the head, the second auxiliary tool being worn on the head of the pilot; and transmitting to the drone a maneuvering signal, the maneuvering signal including information to instruct the drone with respect to vertical movement or rotational movement of the drone using rotation information on the rotational displacement of the head, wherein the drone comprises:
   an image device that acquires acquiring image information; and
   an image transmitter that transmits the acquired image information to a maneuvering signal transmitter set, and wherein the maneuvering signal transmitter set further comprises:
   an image receiver that receives the image information transmitted from the drone; and
   a display device that displays the image information,
   wherein the maneuvering signal transmitter set further comprises
   a processor configured to predict a flight location of the drone or a flight route of the drone after a predetermined time using the received image information, and
   wherein the display device further displays the predicted flight location or the predicted flight route.

* * * * *